United States Patent

[11] 3,631,567

[72] Inventor Theodore S. Reinke
 Box 355, Cambridge, Md. 21613
[21] Appl. No. 879,127
[22] Filed Nov. 24, 1969
[45] Patented Jan. 4, 1972

[54] OYSTER OPENING AND REMOVING DEVICE
 7 Claims, 3 Drawing Figs.
[52] U.S. Cl. .................................................. 17/76
[51] Int. Cl. .................................................. A22c 29/00
[50] Field of Search ........................................... 17/74, 75, 76

[56] References Cited
UNITED STATES PATENTS
1,445,672 2/1923 Egli .............................. 17/76

*Primary Examiner*—Lucie H. Laudenslager
*Attorney*—Scrivener, Parker, Scrivener and Clarke ABSTRACT: Device for separating the valves of a partially opened oyster and removing the oyster, comprising diverging surfaces over which the valves are pushed to fully separate them, and cutting members which engage and follow the inner surfaces of the valves as they are separated and which cut the muscle which connects the oyster to the valves.

PATENTED JAN 4 1972

3,631,567

INVENTOR
THEODORE S. REINKE

BY
Scrivener Parker Scrivener + Clarke
ATTORNEYS 3,631,567

OYSTER OPENING AND REMOVING DEVICE

DESCRIPTION OF THE INVENTION

Figure 3:
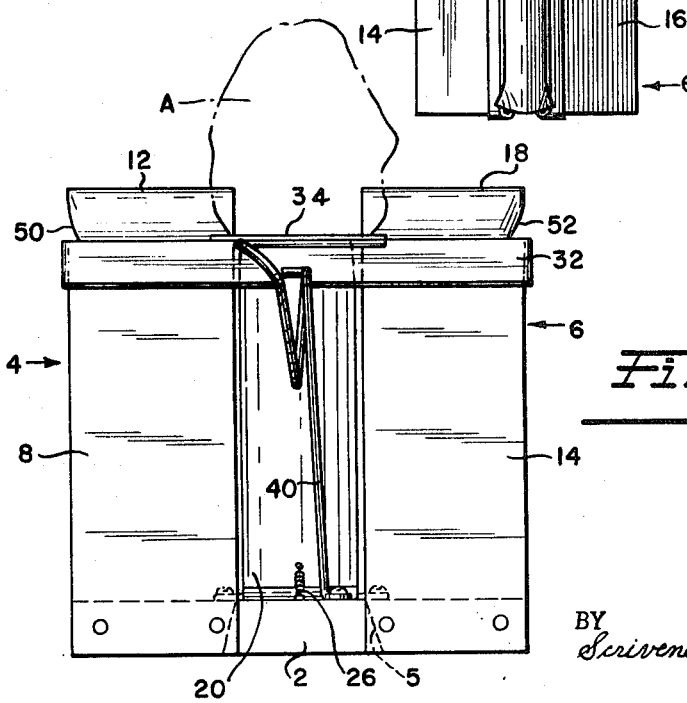
FIG. 3 is a side view.

In accordance with the invention an oyster is first treated, as by electric shock or immersion in hot water, to partially separate the two valves, a very small separation being all that is required, and means are provided by the invention for forcing to fully open condition the two valves of such a partially opened oyster. In the embodiment of the invention disclosed in the drawings these means comprise a base 2 from which there extend upwardly two spaced members 4, 6 each of which has flat exterior walls which converge upwardly from the base to a sharp linear ridge, one member having walls 8, 10 which converge to ridge 12 and the other having walls 14, 16 which converge to ridge 18. These members 4, 6 are aligned with each other and the corresponding side members lie 8, 14 and 10, 16 lie in the same plane, and the members 4, 6 extend to the same height above the base whereby the linear ridges are also aligned. The two members 4, 6 are spaced apart such a distance that the adjacent edges of the aligned walls of the members are closer than the lateral width of the valves of an oyster of normal legal size, as clearly shown at A in FIG. 3. It will be apparent that if such an oyster, having been partially opened, is placed between and bridging the two members 4, 6 with the inner surfaces of its two valves engaging the sidewalls of members 4, 6 is then forced downwardly, the downwardly diverging wall members 8, 10 and 14, 16 will force the two valves apart to an extent determined by the extent of downward movement of the oyster.

Means are also provided by the invention for engaging the inner surfaces of the two valves as the oyster is forced downwardly in the described manner, to cut the muscle which attaches the oyster to the valves, thereby completely separating or "shucking" the oyster from the valves. Such means comprise two vertically extending cutting members 20, 22 which are pivotally connected at their lower ends to the base 2 and extend upwardly therefrom in the space between the two oyster opening members 4, 6, with their upper ends just below the ridges 12, 18, and being slightly less in width than the space between the members 4, 6. These cutter members are preferably formed of sheet metal, having sharp upper edges, and at their upper parts, each has a shallow outwardly convex cross-sectional shape, with approximately the curvature of the inner surface of one of the valves of an oyster. These cutting members are constantly and resiliently urged outwardly away from each other by spring means such as those shown at 24, 26 in the drawings. It will be seen that if the sharp, upper edges of these cutting members are moved along the inner surfaces of the two valves of an oyster as the oyster is forced downwardly over the members 4, 6 they will cut the muscle which holds the oyster to the valves.

Figure 1:
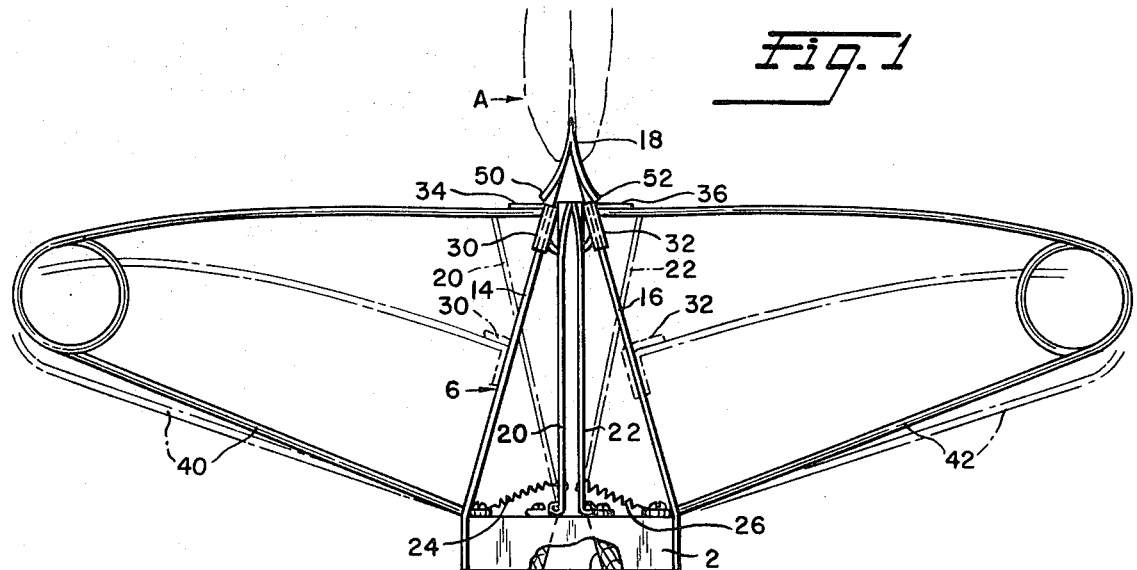
FIG. 1 is an end view of the oyster opening and removing device.
Figure 2:
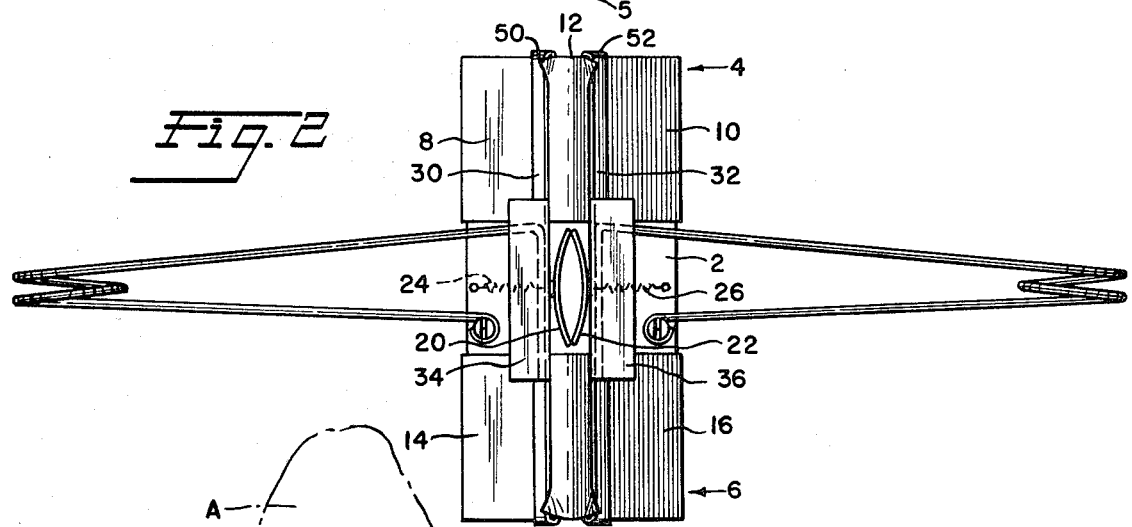
FIG. 2 is a top view.

Means are provided by the invention for normally restraining the cutter members from outward movement away from each other and for causing the downward movement of the oyster over the valve opening members 4, 6 to progressively position the cutter members so that their upper cutting edges will be constantly in engagement with the inner surfaces of the two valves. Such means comprise two elongated members 30, 32 which are, respectively, slidably mounted on the aligned, slanting surfaces of the two valve opening members 4, 6 so that each of these sliding members may move up and down the aligned member on which it is mounted. Each sliding member is provided on its upper edge with an outwardly turned flange 34 or 36 which bridges the gap between the valve opening members 4, 6, and each sliding member is constantly urged to a normal upper position adjacent the aligned upper ridge lines of the valve opening members by spring means such as those shown at 40, 42, which engage the lower surfaces of the flanges 34, 36, in which position the sliding members hold the cutter members in their normal position closely adjacent each other. The upward movement of the restraining members 30, 32 under the influence of springs 40, 42 is limited by ears 50, 52 which are turned outwardly from the upper part of the walls 8, 10 and 14, 16. The sliding members may be moved downwardly to any extent against the force of springs 40, 42 by pressure exerted downwardly on the flanges by the descending oyster, and as they are moved downwardly they move away from each other because of their movement along the diverging walls of members 4, 6, permitting the resilient means 24, 26 to move the cutter members away from each other as shown in dotted lines in FIG. 1, thus causing their upper cutting edges to follow the inner surfaces of the two valves of the oyster.

In the use and operation of the device, an oyster is first partially opened in any suitable way, such as by an electric shock or immersion in hot water, and is then positioned at the upper part of the device bridging the gap between the two members 4, 6 with the inner surfaces the lower or outer edges of its valves engaging the oppositely diverging sides 8, 10 and 14, 16 of the valve opening members 4, 6. The oyster is now forced downwardly, causing the downwardly diverging surfaces to progressively separate the valves. At the same time the sliding members 30, 32 are also forced downwardly by pressure of the valves of the oyster on flanges 34, 36 and as these sliding members move along the downwardly diverging surfaces 8, 10 and 14, 16 they move farther apart and as they do so the resilient means attached to each of the cutting members pulls the cutting members apart causing their upper cutting edges to follow the inner surfaces of the valves to thereby cut the oyster from the valve.

I claim:

1. An oyster valve separator and shucker for removing the meat from each valve of a bivalve oyster, comprising
   a base;
   a pair of stationary walls integrally fixed to said base in spaced apart relation, each said wall having an outer surface, said outer surfaces converging toward one another to form a fixed wedge-shaped valve separator, each said outer surface being adapted to guide the inner free edge of one valve of a slightly opened bivalve oyster for causing the valves to be completely opened as the oyster is forcibly pressed against said separator;
   a pair of cutting members associated respectively with said outer surfaces for simultaneously removing meat from both valves of the bivalve oyster, both said cutting members being movable simultaneously outwardly from a first position adjacent said associated wall surface to a second varying position extending outwardly from said associated outer surface; and
   biasing means for biasing said cutting members from said first position toward said second position, whereby said cutting members follow the contour of the inner surfaces of the bivalve oyster as the oyster is forcibly pressed toward and moved along said convergent outer surfaces.

2. An oyster valve separator and shucker according to claim 1 wherein each said stationary wall includes a pair of portions, said portions being separated by a space having a width less than the width of a normal legal oyster, said cutting members being positioned between said portions when in the first position.

3. An oyster valve separator and shucker according to claim 2 wherein
   each said member is pivotally connected at one end to said base for rotational movement between the first and second positions, and includes a cutting edge at the other end, said cutting edge being shallowly convex in cross section.

4. An oyster valve separator and shucker according to claim 3 further including means for normally restraining said cutting members from movement toward said second position and for guiding the free edges of an oyster over said outer surfaces of said stationary walls.

5. An oyster valve separator and shucker according to claim 4 wherein said restraining means includes
- a pair of elongated members slidably mounted respectively on each of said outer surfaces, each said elongated member including an outwardly turned flange bridging the space between said portions; and
- second biasing means for biasing said elongated members toward a first position adjacent the apex of said wedge-shaped valve separator, whereby each said outwardly turned flange may be engaged by the free ends of an oyster being pressed toward said separator to move said elongated members along said outer surfaces against the bias of said second biasing means permitting said cutting members to pivot toward said second position to maintain said cutting edges in contact with the inner surfaces of the oyster valves being pressed against said outer wall surfaces.

6. An oyster valve separator and shucker according to claim 3 wherein
- said base includes an opening between said pivotal connections of said cutting members for receiving the meat cut from the oyster valves.

7. A device for separating the valves of an oyster and cutting the oyster from them, comprising two diverging walls for engaging respectively the inner surfaces of the free edges of the valves for causing separation of the valves as the oyster is pushed over the surfaces, each diverging wall comprises two coplanar parts which are spaced apart sufficiently to be bridged by a normal legal oyster; a base from which the walls converge; cutting means associated with said surfaces having cutting edges which are positioned and operable to engage and follow the inner surfaces of the valves as the oyster is pushed over the diverging surfaces to thereby cut the muscle which holds the oyster to the valves, said cutting means are positioned between the parts of the spaced diverging walls and are pivotally connected at their one ends to the base and extend therefrom between the spaced parts of the walls and at their other ends terminate just short of the intersection of the converging walls, said ends are outwardly shallowly convex in cross section and are normally positioned closely adjacent each other; resilient means constantly urging the cutting means away from each other; restraining means mounted on the walls for normally holding the cutting means closely adjacent each other; and means on said restraining means positioned for engagement by an oyster being opened for moving the restraining means along the diverging walls to permit the resilient means to progressively move the cutting means away from each other whereby they follow the inner surfaces of the valves of the oyster being opened.

* * * * *